(12) United States Patent
Tundo et al.

(10) Patent No.: US 9,574,647 B2
(45) Date of Patent: Feb. 21, 2017

(54) RECIPROCATING ROCKING DEVICE

(71) Applicant: Acea M. Mosey, Buffalo, NY (US)

(72) Inventors: Vincent E. Tundo, Silver Creek, NY (US); Anthony W. Fini, Blasdell, NY (US)

(*) Notice: Subject to any disclaimer, the term of this patent is extended or adjusted under 35 U.S.C. 154(b) by 11 days.

(21) Appl. No.: 14/524,728

(22) Filed: Oct. 27, 2014

(65) Prior Publication Data
US 2015/0040694 A1 Feb. 12, 2015

Related U.S. Application Data

(63) Continuation-in-part of application No. 13/228,866, filed on Sep. 9, 2011, now abandoned.

(60) Provisional application No. 61/446,261, filed on Feb. 24, 2011.

(51) Int. Cl.
| | |
|---|---|
| F16H 21/40 | (2006.01) |
| A47D 9/02 | (2006.01) |
| A47C 3/029 | (2006.01) |
| A61G 5/10 | (2006.01) |
| A47C 3/02 | (2006.01) |
| A47C 3/027 | (2006.01) |
| F16H 21/24 | (2006.01) |

(52) U.S. Cl.
CPC ............... *F16H 21/40* (2013.01); *A47C 3/02* (2013.01); *A47C 3/027* (2013.01); *A47C 3/029* (2013.01); *A47D 9/02* (2013.01); *A61G 5/10* (2013.01); *F16H 21/24* (2013.01); *Y10T 74/18056* (2015.01); *Y10T 74/18216* (2015.01)

(58) Field of Classification Search
CPC A61G 5/104; A61H 1/003; A63B 2071/0018; B62B 9/22
See application file for complete search history.

(56) References Cited

U.S. PATENT DOCUMENTS

| | | |
|---|---|---|
| 60,793 A | 1/1867 | Ryan |
| 418,571 A | 12/1889 | Kade |
| 529,816 A | 11/1894 | Sorrell |
| 1,704,914 A | 3/1929 | Fairweather |
| 1,795,246 A * | 3/1931 | Brown ...................... B62B 9/22 5/109 |
| 1,985,131 A | 12/1934 | Wilke |
| 2,496,733 A * | 2/1950 | Mackie ...................... B62B 9/22 104/173.1 |
| 2,632,517 A | 3/1953 | Fraunfelder et al. |
| 2,805,427 A | 9/1957 | Edgmon |
| 2,888,086 A | 5/1959 | O'Brien |
| 3,019,052 A | 1/1962 | Zawadzki |
| 3,886,608 A | 6/1975 | Casella |

(Continued)

*Primary Examiner* — Robert G Santos
*Assistant Examiner* — Myles Throop
(74) *Attorney, Agent, or Firm* — Simpson & Simpson, PLLC (57) ABSTRACT

A reciprocating rocking device for the rocking of a chair or cradle, the chair or cradle having rockers and a seat member, the reciprocating rocking device comprising a base secured to the rockers, the base comprising a first bracket, a second bracket secured to the seat member of the chair or cradle, a tension member connected to the second bracket, an eccentric, the eccentric constantly engaged with the second bracket and, a motor secured to the first bracket, the motor having a drive shaft operatively arranged to drive the eccentric, wherein the motor is coaxially arranged with the eccentric.

5 Claims, 12 Drawing Sheets (56) References Cited

U.S. PATENT DOCUMENTS

| | | | |
|---|---|---|---|
| 4,042,102 A | 8/1977 | Wadensten | |
| 4,118,046 A | 10/1978 | Vaughan | |
| 4,419,777 A | 12/1983 | Parker | |
| 4,768,497 A | 9/1988 | Winge | |
| 4,969,451 A | 11/1990 | Totten | |
| 5,002,144 A | 3/1991 | McMahon | |
| 5,476,429 A * | 12/1995 | Bigelow | A63B 21/0056 414/921 |
| 5,643,143 A * | 7/1997 | Burak | A63B 71/0009 482/54 |
| 6,793,229 B1 | 9/2004 | Nadal | |
| 7,100,724 B2 | 9/2006 | Haigh | |
| 8,398,169 B2 | 3/2013 | LaPointe | |

* cited by examiner

RECIPROCATING ROCKING DEVICE

CROSS-REFERENCE TO RELATED APPLICATIONS

This patent application is a Continuation-in-Part of application Ser. No. 13/228,866, filed on Sep. 9, 2011, which application claims the benefit under 35 U.S.C. §119(e) of U.S. Provisional Patent Application No. 61/446,261, filed Feb. 24, 2011, which applications are incorporated herein by reference.

FIELD OF THE INVENTION

The invention relates generally to a reciprocating rocking device, and, more specifically, to a reciprocating rocking device for rocking a wheelchair, cradle, rocking chair, and the like which provides a continuously smooth motion.

BACKGROUND OF THE INVENTION

Recent studies demonstrate that a rocking motion, including gliding, is beneficial to both physical and mental health. Patients with mid-stage dementia are often difficult to calm. Because these people are aware, to some extent, of what is happening to them, they often feel fear, anger and anxiety. A study sponsored by the School of Nursing of the University of Rochester found that the act of rocking released endorphins that calm and relax patients suffering from dementia. Researchers at the Medical College of Virginia found that one hour of a rocking-type motion per day provides relief to people suffering from arthritis and can help post-operative patients recover faster and suffer from fewer complications. Smooth repetitive motion also was shown to improve muscle tone and flexibility. Children with ADD and similar learning difficulties were reported to be able to concentrate while they are experiencing of a rocking motion. Observations of patients made in the Orange Spine and Disc Rehabilitation Center in California led to conclusions that the rocking motion of a rocking chair combined with some basic exercises help relieve chronic back pain. It is well known that rocking helps to induce sleep, especially in infants. Such rocking, of course, may be provided by rocking an infant in a cradle instead of a rocking chair.

In addition to the therapeutic effects of rocking, many child caregivers simply enjoy rocking an infant in a rocking chair. The time spent rocking can be a time of bonding for both a parent or caregiver and the child. Adults of all ages also enjoy the rocking motion provided by a rocking chair. Sometimes a user isn't physically able to rock in a chair and requires the assistance of a caregiver.

In order for the beneficial effects of rocking to be fully achieved, the rocking motion should be continuous, that is, without abrupt changes in direction and also be performed as quietly as possible. A caregiver can easily rock a cradle or chair with ease in a quiet manner, but this requires the caregiver to stay next to the cradle or chair and prevents other tasks from being completed. Additionally, the caregiver can become fatigued from manually rocking the cradle or chair. In order to alleviate this fatigue what is needed is a device which simulates the rocking motion of a caregiver.

A problem that occurs with mounting a power source to the cradle or chair is the noise that results from its operation. Additionally, excessive noise occurs if an extensive gear train is used to transfer rotational movement from a motor from the rotating gears meshing with one another. A second problem associated with a caregiver manually rocking a wheelchair is the abrupt change in direction due to the front wheels which pivot in order to steer the wheelchair when moving forward. The constant forward and backward motion the caregiver performs in order to rock a patient in a wheelchair is both non-continuous and places excessive physical strain on the caregiver.

Thus, there has been a long-felt need for a device which can rock or glide cradles, chairs, wheelchairs, or the like in a smooth and continuous manner without excessive noise from complicated gear couplings or the need of a caregiver present.

BRIEF SUMMARY OF THE INVENTION

The present invention broadly comprises a reciprocating rocking device for the gliding of a wheelchair, the wheelchair having a pair of front wheels, the reciprocating rocking device comprising a frame comprising a pair of tracks, each track having a channel therein, a bracket comprising two pairs of rollers, each of the two pairs of rollers arranged for rolling engagement within one of the channels, the two pairs of rollers arranged parallel to one another and joined to one another by a first and second drawbar, the first and second drawbars arranged parallel to and spaced apart from one another and perpendicularly to the tracks, the first and second parallel drawbars arranged to hold the pair of front wheelchair wheels, a linkage connected to the bracket, an eccentric connected to the linkage and arranged to move the bracket in a linear, reciprocating manner within the tracks and, a motor secured to the frame, the motor having a drive shaft operatively arranged to drive the eccentric.

Additionally, the present invention comprises a reciprocating rocking device for the rocking of a chair or cradle, the chair or cradle having rockers and a seat member, the reciprocating rocking device comprising a base secured to the rockers, the base comprising a first bracket, a second bracket secured to the seat member of the chair or cradle, a tension member connected to the second bracket, an eccentric, the eccentric constantly engaged with the second bracket and, a motor secured to the first bracket, the motor having a drive shaft operatively arranged to drive the eccentric, wherein the motor is coaxially arranged with the eccentric.

Additionally, the present invention comprises a reciprocating rocking device for the rocking of a chair or cradle, said chair or cradle having rockers and a seat member, said reciprocating rocking device comprising a base secured to the rockers, a bracket secured to the seat member of the chair or cradle, a linkage comprising a first member and a second member, wherein each member is rotatably secured to one another and the second member is connected to the bracket and, a motor secured to the base, the motor having a drive shaft operatively arranged to drive the first member of the linkage, wherein the motor is coaxially arranged with the first member of the linkage.

Even further, the present invention comprises a reciprocating rocking device for the gliding of a chair or cradle, said reciprocating rocking device comprising a base, a glider secured to the base, a body comprising a centrally arranged channel, the body secured to the glider, an eccentric, the eccentric constantly engaged with the channel of the body and, a motor secured to the base, the motor having a drive shaft operatively arranged to drive the eccentric, wherein the motor is coaxially arranged with the eccentric.

Accordingly, the present invention comprises a device that provides a powered, continuously smooth rocking or gliding motion when used in combination with a rocking chair, cradle, or a wheeled device such as a wheelchair.

A primary object of the invention is to provide a device which can rock or glide a chair, cradle, wheelchair, or the like in a smooth and continuous manner without excessive noise from complicated gear couplings or the assistance of a caregiver.

These and other objects, features and advantages of the present invention will become readily apparent upon a review of the following detailed description of the invention, in view of the drawings and appended claims.

BRIEF DESCRIPTION OF THE DRAWINGS

The nature and mode of operation of the present invention will now be more fully described in the following detailed description of the invention taken with the accompanying figures, in which:

FIG. 5 is a detailed side view of track 18a and roller 16a;

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention. The assembly of the present invention could be driven by hydraulics, electronics, and/or pneumatics.

Figure 1:
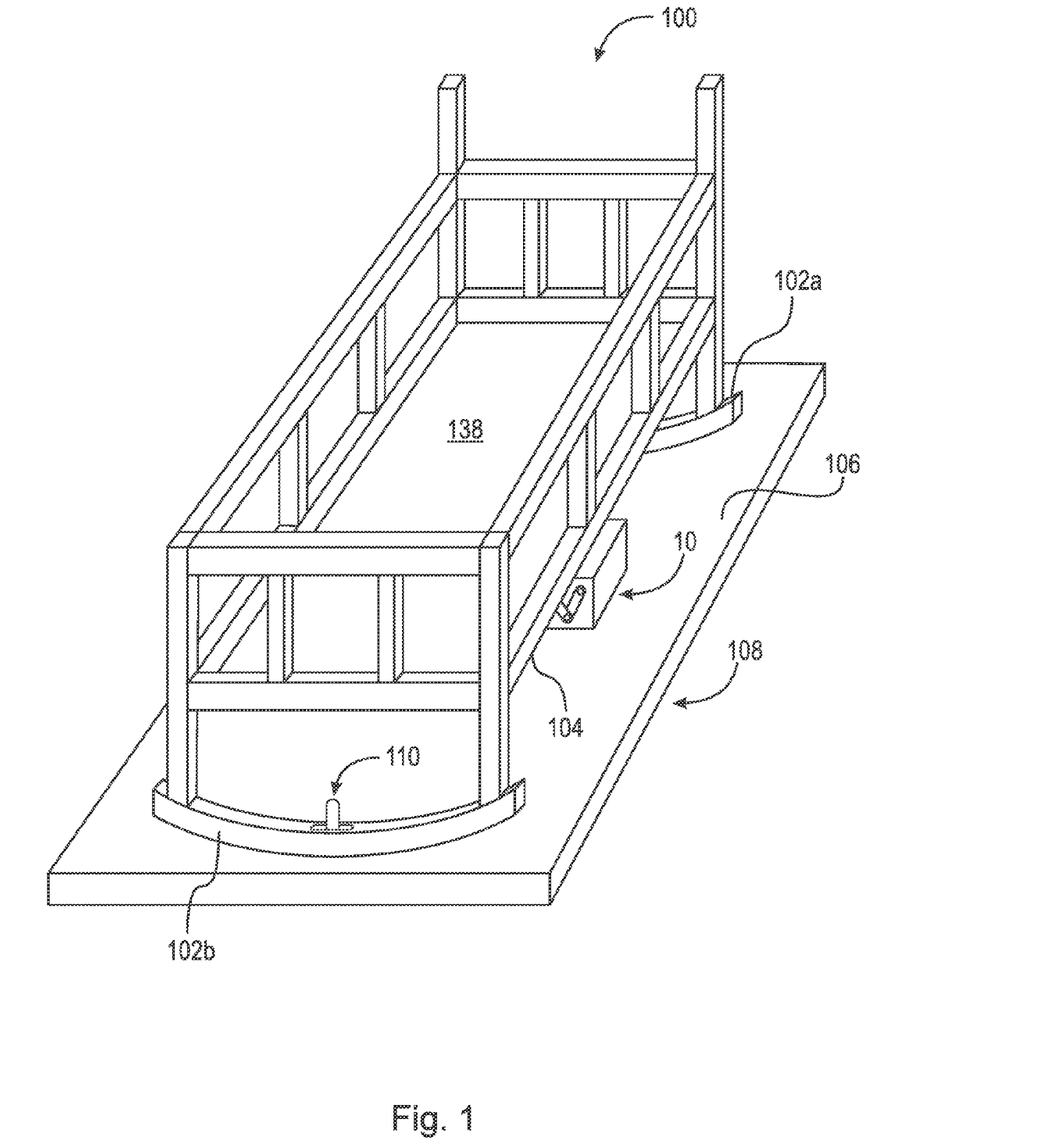
FIG. 1 is a perspective view of a first embodiment of the present invention secured to cradle 100.

Adverting now to the figures, FIG. 1 is a perspective view of a first embodiment of the present invention secured to cradle 100. Motorized reciprocating motion device 10 provides a reciprocating rocking motion for cradle 100. Cradle 100 comprises bed board 138, bottom surface 104, rockers 102a and 102b, and base 108. Cradle 100 is removably secured to base 108.

Figure 2:
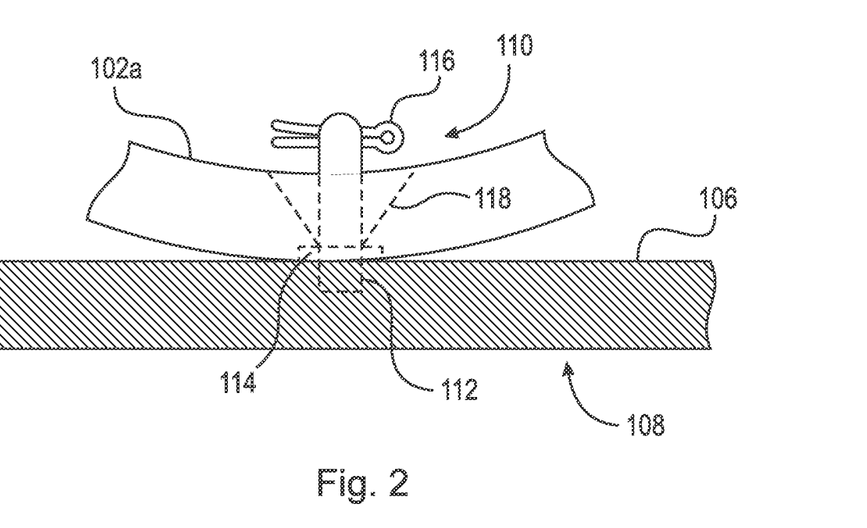
FIG. 2 is a fragmentary side view of rocker 102a and base 108 of cradle 100.

FIG. 2 is a fragmentary side view of rocker 102a and base 108 of cradle 100 and further illustrates the details of mount 110, which includes connector 112 and support plate 114 extending into notch 118 through rocker 102a into base 108 to attach cradle 100 to base 108. In a preferred embodiment, notch 118 is cut so that the angle of the notch is comparable to the maximum rocking angle. In this example, pin 116 secures to connector 112 allowing cradle 100 to be lifted and moved along with base 108 while also staying secured to base 108. In a preferred embodiment, pin 116 secures to mount 110. It should be appreciated, however, that there are many other ways of maintaining the connection which are considered to be within the scope of the invention as claimed. For example, pin 112 can be threaded to accept a nut and washer.

Figure 3:
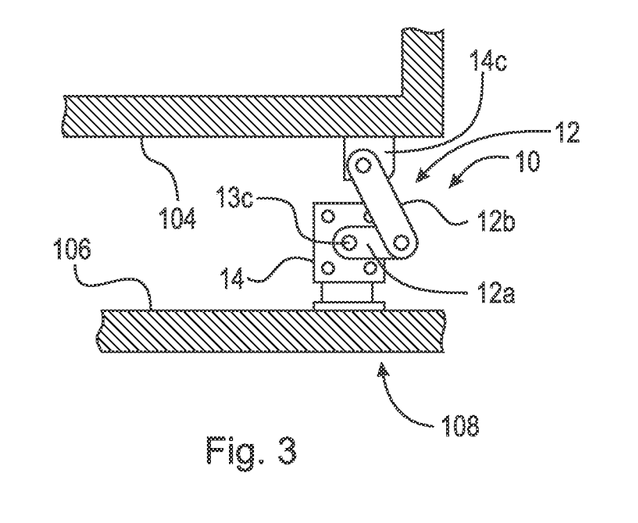
FIG. 3 is fragmentary a side view of device 10 secured to bottom surface 104 and to top surface 106 of bed board 138 and base 108, respectively.

FIG. 3 is a fragmentary side view of device 10 secured to bottom surface 104 and to top surface 106 of bed board 138 and base 108, respectively. Motor 14 comprises driveshaft 13c and rotates linkage 12. Linkage 12 comprises first member 12a and second member 12b. Driveshaft 13c non-rotatably engages first member 12a and second member 12b is rotatably secured to bracket 14c. Bracket 14c is arranged on bottom surface 104 at an edge of cradle 100. In a preferred embodiment, the rotary motion produced by a gear motor is converted to a reciprocating motion to produce a continuous, smooth rocking or gliding of cradle 100. This is accomplished by functionally coupling the rotary output of the gear motor to linkage 12. The weight of cradle 100 and its contents resting on rockers 102a and 102b seek equilibrium and, thus, provide a counterforce to any rocking motion. Device 10 is secured between bottom surface 104 and top surface 106 and overcomes the counterforce to rocking to produce a smooth, continuous rocking movement. Device 10 provides the energy required to maintain the rocking motion in a continuous manner.

Figure 4A:
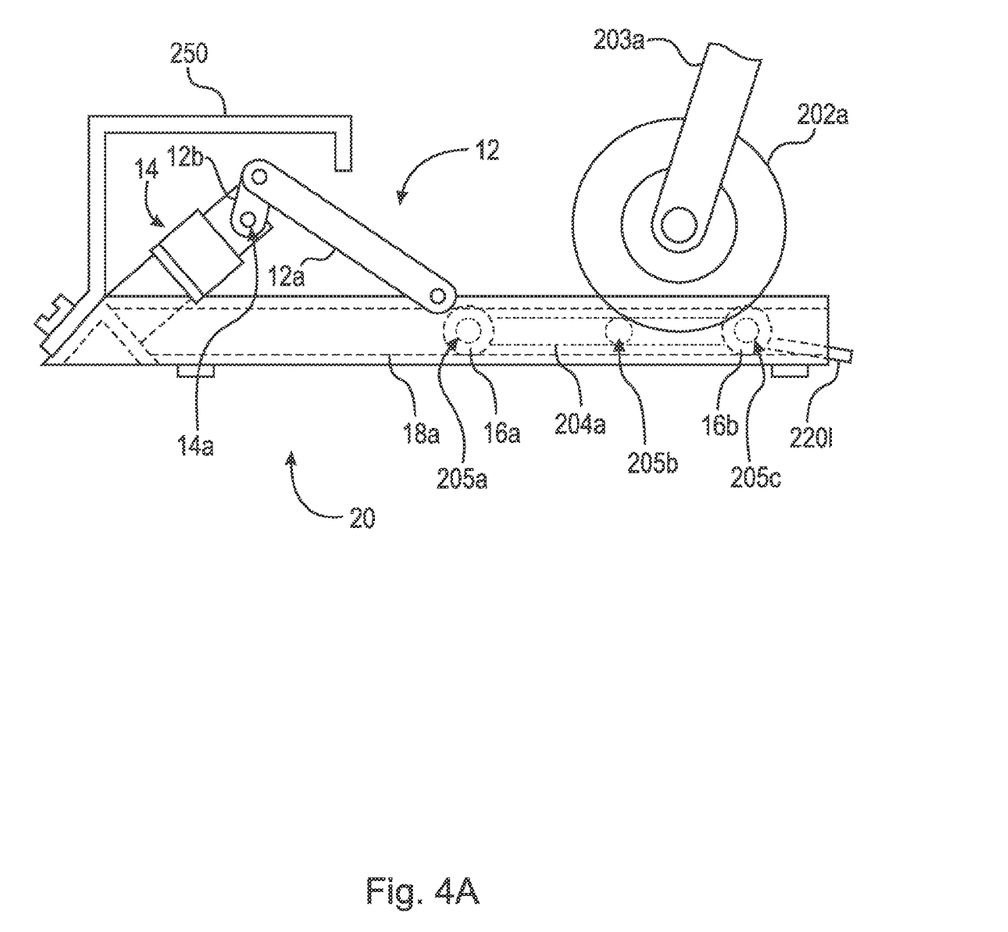
FIG. 4A is a side view of a second embodiment of the present invention secured to wheelchair wheel 202.

FIG. 4A is a side view of a second embodiment of the present invention secured to wheelchair wheels 202a and 202b. As discussed above, wheelchairs comprise rear weight bearing wheels and front steering or caster wheels. Wheels 202a and 202b are supported by frame 20 and secured to a wheelchair by wheel mounts 203a and 203b, respectively. Wheels 202a and 202b of a wheelchair are easily rolled onto frame 20 using ramps 220l and 220r. Frame 20 provides support for both device 10 and wheels 202a and 202b of a wheelchair. In a preferred embodiment, motor 14 is secured to track 18a and track 18b and is protected by housing 250. Rollers 16a and 16b mount to drawbars 205b and 205c allow bracket 204a to move within track 18a with reduced friction. Additionally, first member 12a, second member 12b, and third member 12c are rotatably secured to one another and form linkage 12. Second member 12b is secured to gear motor 14 via driveshaft 14a. Linkage 12 is designed to translate the rotary motion of motor 14 to a reciprocating motion in order to provide a smooth and continuous reciprocating rocking or gliding motion to the wheelchair. It should be appreciated, however, that the number of members required is reduced when the members are replaced by with an eccentric, which could also reduce the noise while in operation.

Figure 4B:
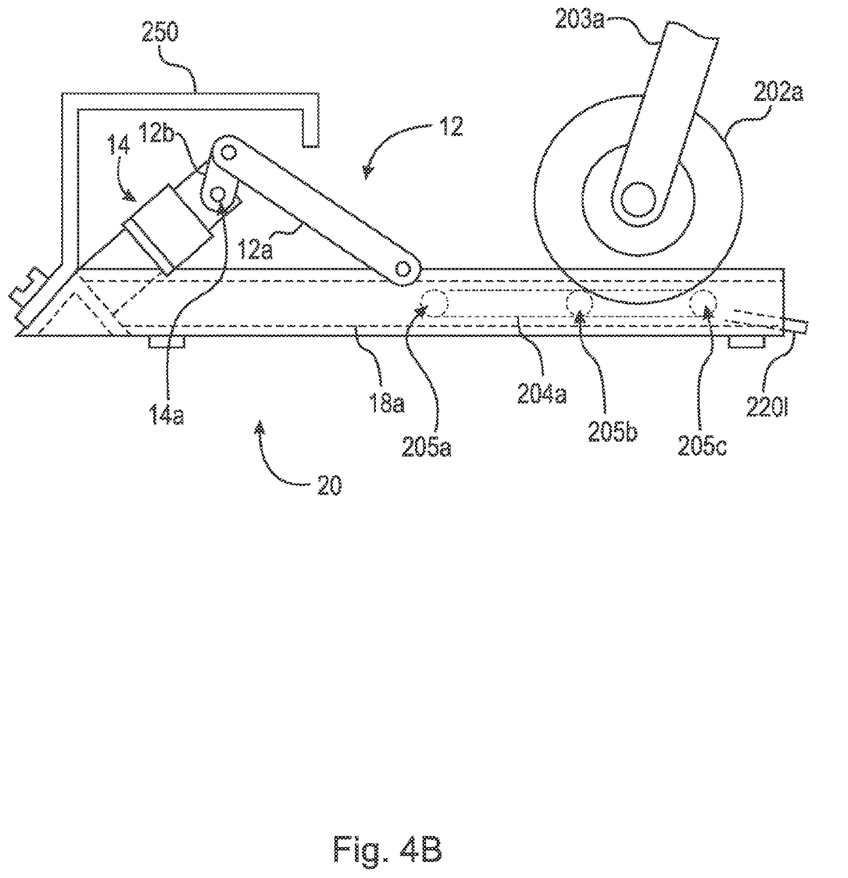
FIG. 4B is a side view of a second embodiment of the present invention secured to wheelchair wheel 202a with rollers 16a and 16b removed.

FIG. 4B is a side view of a second embodiment of the present invention secured to wheelchair wheels 202a and 202b with rollers 16a and 16b removed. The figure shows that wheel 202a is arranged between drawbars 205b and 205c in order to secure wheel 202a during operation. If wheel 202a needed to be secured even further, the gap between drawbar 205b and drawbar 205c could be increased to allow wheel 202a to sit lower in bracket 204a. It is important to note that drawbars 205a, 205b, 205c, and 205d are all perpendicularly secured to bracket 204a and 204b (shown in FIG. 6) and also arranged parallel to one another.

Figure 5:
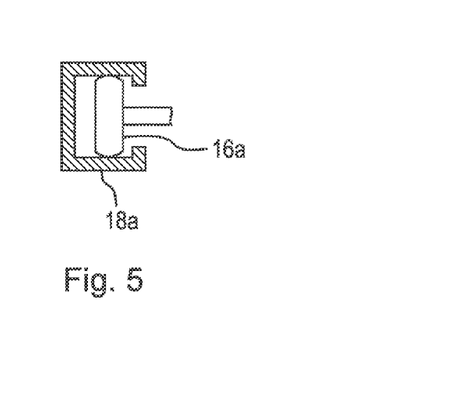

FIG. 5 is a detailed side view of roller 16a positioned within track 18a. In a preferred embodiment, roller 16a is a ball bearing roller. It should be appreciated, however, that the use of different devices to reduce the friction on track 18a is possible and considered to be within the scope of the invention as claimed. For example, roller 16a and track 18a could be concentric tubes which are telescopingly engaged.

Figure 6:
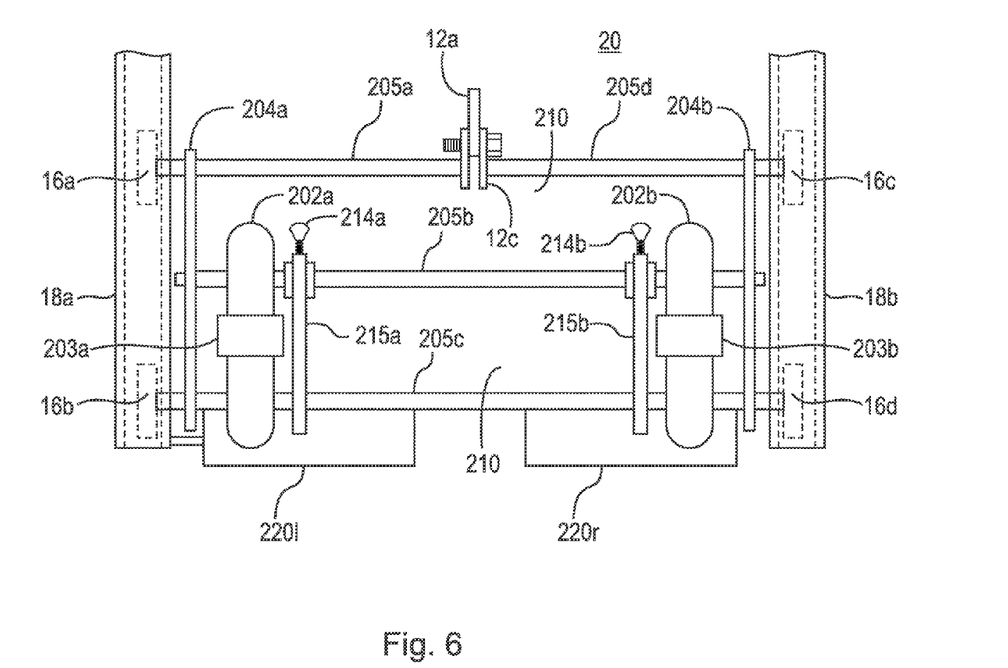
FIG. 6 is a top view of the second embodiment of the present invention secured to wheelchair wheels 202a and 202b.

FIG. 6 is a top view of the second embodiment of the present invention secured to wheelchair wheels 202a and 202b. Drawbars 205a, 205b, 205c, and 205d are secured to brackets 204a and 204b. Drawbar 205a has roller 16a secure to one end, with the other end of drawbar 205a securing to third member 12c of linkage 12. Drawbar 205d has roller 16c secure to one end, with the other end of drawbar 205d securing to third member 12c of linkage 12. Additionally, rollers 16b and 16d secure to either end of drawbar 205c. Rollers 16a, 16b, 16c, and 16d are securely arranged within track 18 formed within the structure of frame 20. This connection allows a gliding motion of wheels 202a and 202b once wheels 202a and 202b are positioned in space 210. One end of linkage 12 is non-rotatably secured to a motor 14 (shown in FIG. 4) which is supported by frame 20, with the other end of linkage 12 being fixedly secured to drawbars 205a and 205d. In order to provide gliding motion to a wheelchair, wheels 202a and 202b of the wheelchair are positioned within space 210 between drawbars 205b and 205c of brackets 204a and 204b. Rollers 16 are supported by and move within track 18 of base frame 20 and translate the motion to wheels 202a and 202b of a wheelchair supported by frame 20. Wheels 202a and 202b are securely arranged within space 210 that is between drawbars 205b and 205c. Because wheels 202a and 202b are the steering wheels of a wheelchair, they are made to easily turn or caster. In order to keep wheels 202a and 202b from rotating to the point that could cause them to slip into space 210 between drawbars 205b and 205c, frame 20 further comprises wheel guides 215a and 215b. In a preferred embodiment, thumbscrews 214a and 214b are used to loosen and tighten wheel guides 215a and 215b, respectively, which are mounted on drawbars 205b and 205c. By loosening thumbscrews 214a and 214b, wheel guides 215a and 215b may be adjusted to allow for different wheelchairs to be used, as the wheel base can range from about 15 to 30 inches for a typical wheelchair. Wheel guides 215a and 215b can be set so that they will be close to the inside surface of wheels 202a and 202b, thereby restricting the degree that wheels 202a and 202b can turn. Smooth gliding motion of the wheelchair is provided by rollers 16a, 16b, 16c, and 16d that are firmly seated within track 18. Rollers 16a, and 16c are fixedly secured to drawbars 205a and 205d upon which third member 12c of linkage 12 is fixedly secured. When power is provided to motor 14 (shown in FIG. 4), linkage 12 provides a smooth, continuous gliding motion for frame 20 via its connection to drawbars 205a and 205d. Brackets 204a and 204b are easily moved forward and backward due to the decrease in friction made possible by rollers 16a, 16b, 16c, and 16d. As brackets 204a and 204b are actuated in a forward and reverse motion, wheels 202a and 202b supported on drawbars 205b and 205c of frame 20 are gently, continuously, and smoothly moved in a reciprocating motion by the action of motor 14 and linkage 12. Because the weight of the occupant is centered over the rear supporting wheels of a wheelchair, the chair can be moved easily even by a relatively low-powered motor, such as a 7.5 amp motor.

Figure 7:
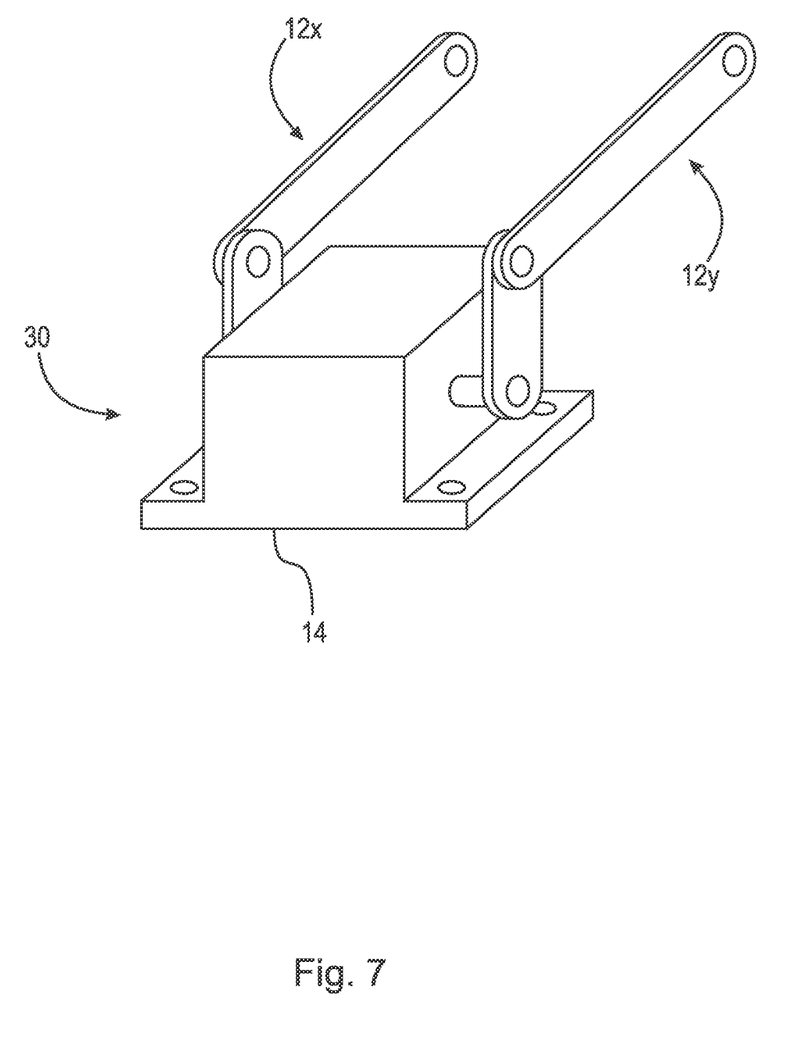
FIG. 7 is a perspective view of device 30 of the present invention.

FIG. 7 is a perspective view of device 30 of the present invention fitted with dual linkages 12x and 12y providing for powered motion to be delivered from both sides of the motor where required. Device 30 can replace device 10 in any of the previous embodiments if a dual gear motor (not shown) is required to power a rocking or gliding device.

Figure 8:
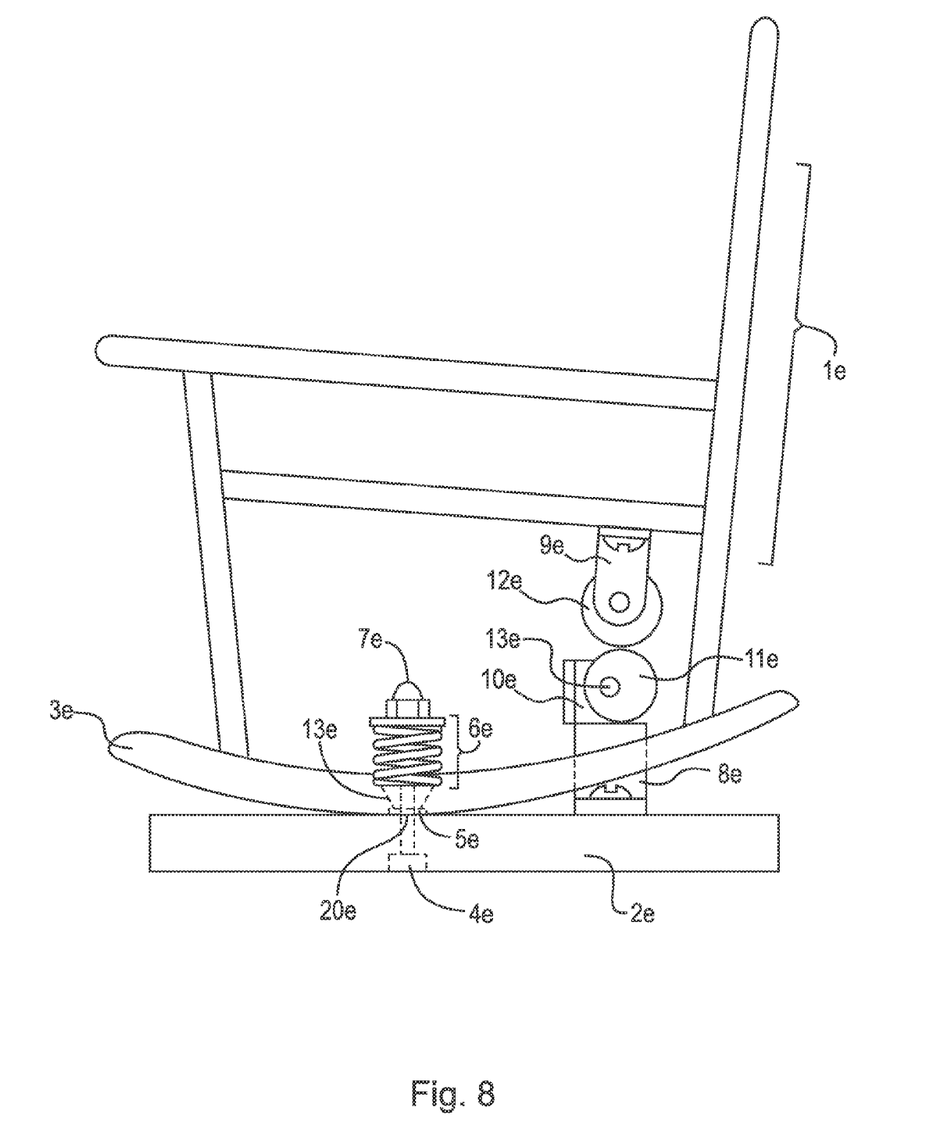
FIG. 8 is a side view of a third embodiment of the present invention secured to chair 1e.

FIG. 8 is a side view of a third embodiment of the present invention secured to chair 1e. Motor 10e and eccentric 11e produce a reciprocal motion that is translated to chair 1e. As chair 1e rocks, each of its rockers 3e has a single point of contact 20e with base 2e. In a preferred embodiment, bolt 4e, washer 5e, and nut 7e secure rockers 3e to base 2e. Notch 13e provides for unimpeded oscillation or rocking of rockers 3e about bolt 4e without damaging rockers 3e. Notch 13e provides space for the rockers to oscillate about bolt 4e without stressing rockers 3e. Spring 6e is secured to rockers 3e and base 2e by bolt 4e and nut 7e. Motor 10e is secured to base 2e by mounting bracket 8e. The rotary motion produced by motor 10e is translated to smooth, continuous, reciprocal motion by eccentric 11e. As eccentric 11e is caused to rotate by motor 10e via driveshaft 13e, its eccentric shape causes wheel 12e, attached to the seat of the chair 1e by mounting bracket 9e, to turn. As the maximum diameter of eccentric 11e contacts wheel 12e it lifts the seat of chair 1e and as the minimum diameter contacts wheel 12e, it allows the seat of chair 1e to lower. Motor 10e can be powered by a variety of power sources, such as, in-house electricity, a battery, or solar energy.

Figure 9:
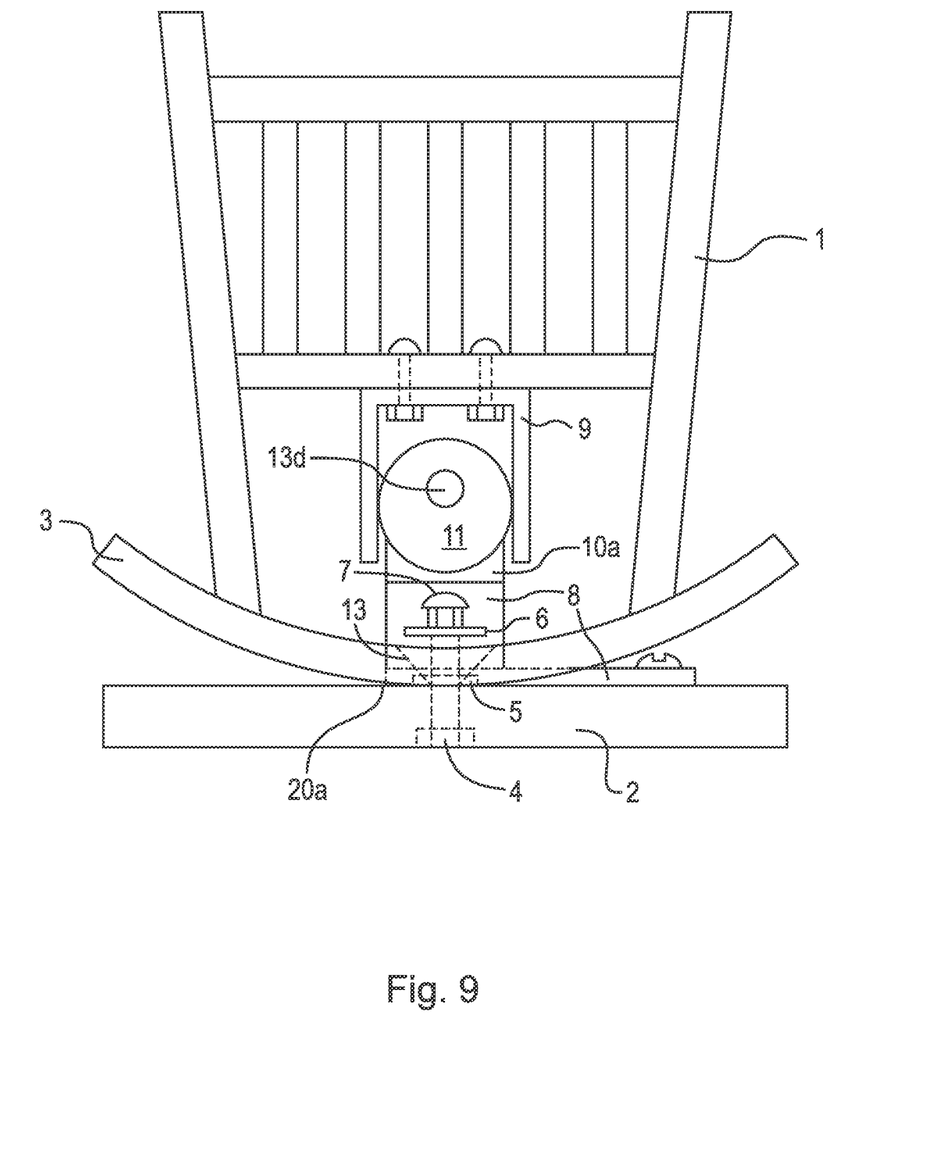
FIG. 9 is a front view of a fourth embodiment of the present invention secured to cradle 1.

FIG. 9 is a front view of a fourth embodiment of the present invention secured to cradle 1. Cradle 1 comprises rockers 3 which secure to base 2 using bolt 4, washer 5, and nut 7 with washer 6. Notch 13 provides for unimpeded oscillation or rocking of rockers 3 about bolt 4 without damaging rockers 3. Notch 13 provides space for rockers 3 to oscillate about bolt 4 without stressing rockers 3. Motor 10a is secured to base 2 via mounting brackets 8. Driveshaft 13d of motor 10a is functionally coupled to eccentric 11 to translate the rotary motion of motor 10a to bracket 9 that is secured to the bottom of cradle 1 to provide a powered continuously smooth, rocking motion to cradle 1 when the power is turned on. The weight of cradle 1 and its contents resting on rockers 3 seek equilibrium and, thus, provide a counterforce to any rocking motion. The continuously smooth rocking motion provided by motor 10a and eccentric 11 overcomes the counterforce to produce a smooth, continuous rocking movement.

Figure 10:
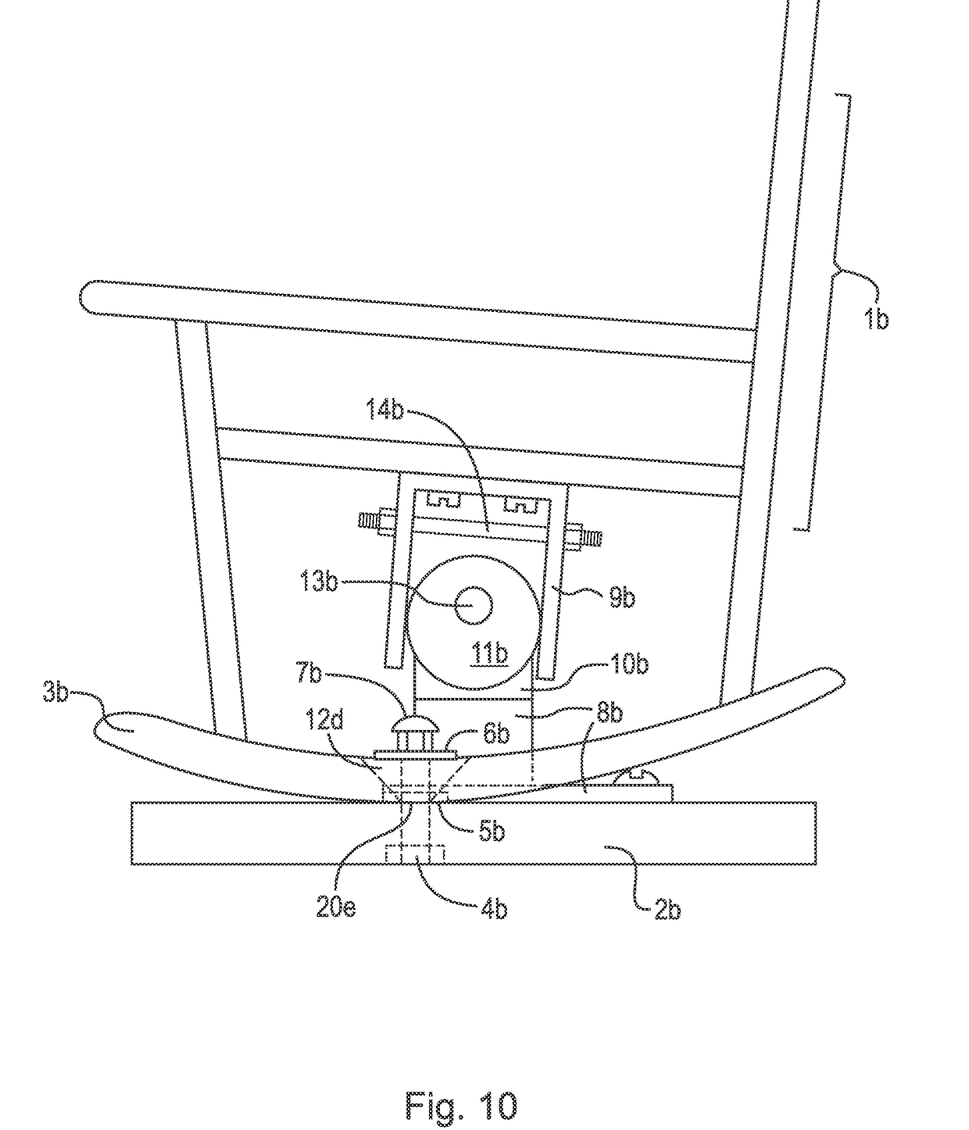
FIG. 10 a side view of a fifth embodiment of the present invention secured to chair 1b.

FIG. 10 a side view of a fifth embodiment of the present invention secured to chair 1b. Rocking chair 1b with rockers 3b is secured to base 2b using bolt 4b, washer 5b, and nut 7b with washer 6b. Notch 12d provides for unimpeded rocking of rockers 3b about bolt 4b without damaging rockers 3b. Notch 12d provides space for rockers 3b to oscillate about bolt 4b without stressing rockers 3b. Motor 10b is secured to base 2b via mounting brackets 8b. Drive shaft 13b of motor 10b is non-rotatably connected to eccentric 11b to translate the rotary motion of motor 10b to bracket 9b that is secured to rocking chair 1b to provide a continuously smooth, rocking motion to chair 1b when the power is turned on. It is important to note that bracket 9b is a u-shaped bracket to allow eccentric 11b to continuously contact bracket 9b. Tension member 14b is arranged within bracket 9b to allow tensioning of bracket 9b which would change the rate of oscillation of chair 1b. The weight of chair 1b and its contents resting on rockers 3b seek equilibrium and, thus, provide a counterforce to any rocking motion. The continuously smooth rocking motion provided by motor 10b and eccentric 11b overcomes the counterforce to produce a smooth, continuous rocking movement.

Figure 11:
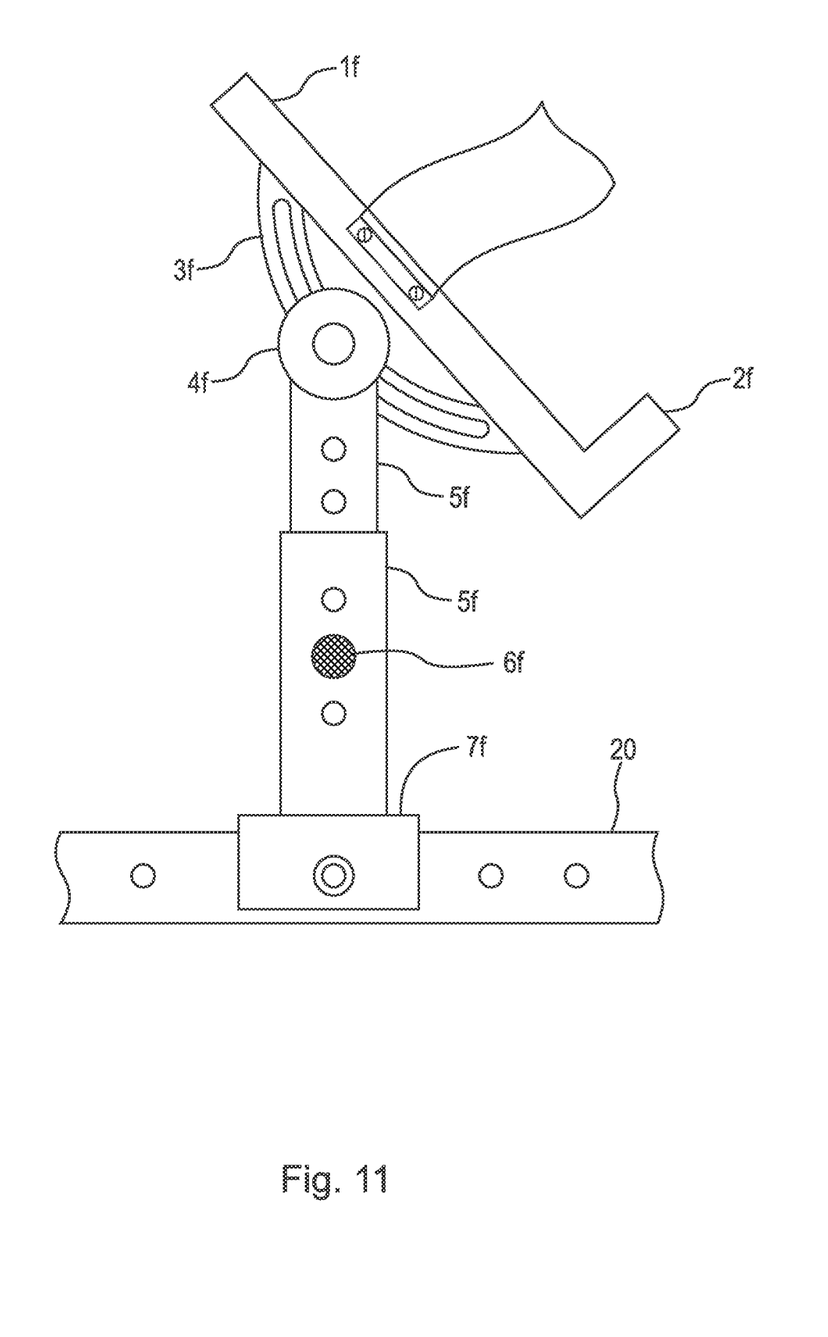
FIG. 11 is a view of a footrest 1f secured to frame 20.

FIG. 11 is a view of footrest 1f secured to frame 20 (shown in FIG. 6) and comprises heel stop 2f to prevent a user's feet from slipping off of footrest 1f. Footrest 1f is secured to angle adjustment 3f which allows footrest 1f to be angled for a user's comfort. Angle adjustment 3f is rotatably connected to footrest 1f via attachment mechanism 4f that is securely attached to brace 5f. Brace 5f supports angle adjustment 3f and allows for the adjustment of the height of footrest 1f. In a preferred embodiment, brace 5f is designed to slide-ably engage to adjust the height of footrest 1f. To maintain the desired height, lock pin 6f is inserted into the aligned apertures of each brace 5f when the desired height has been attained. Brace 5f is secured to base 20 by mounting bracket 7f.

Figure 12:
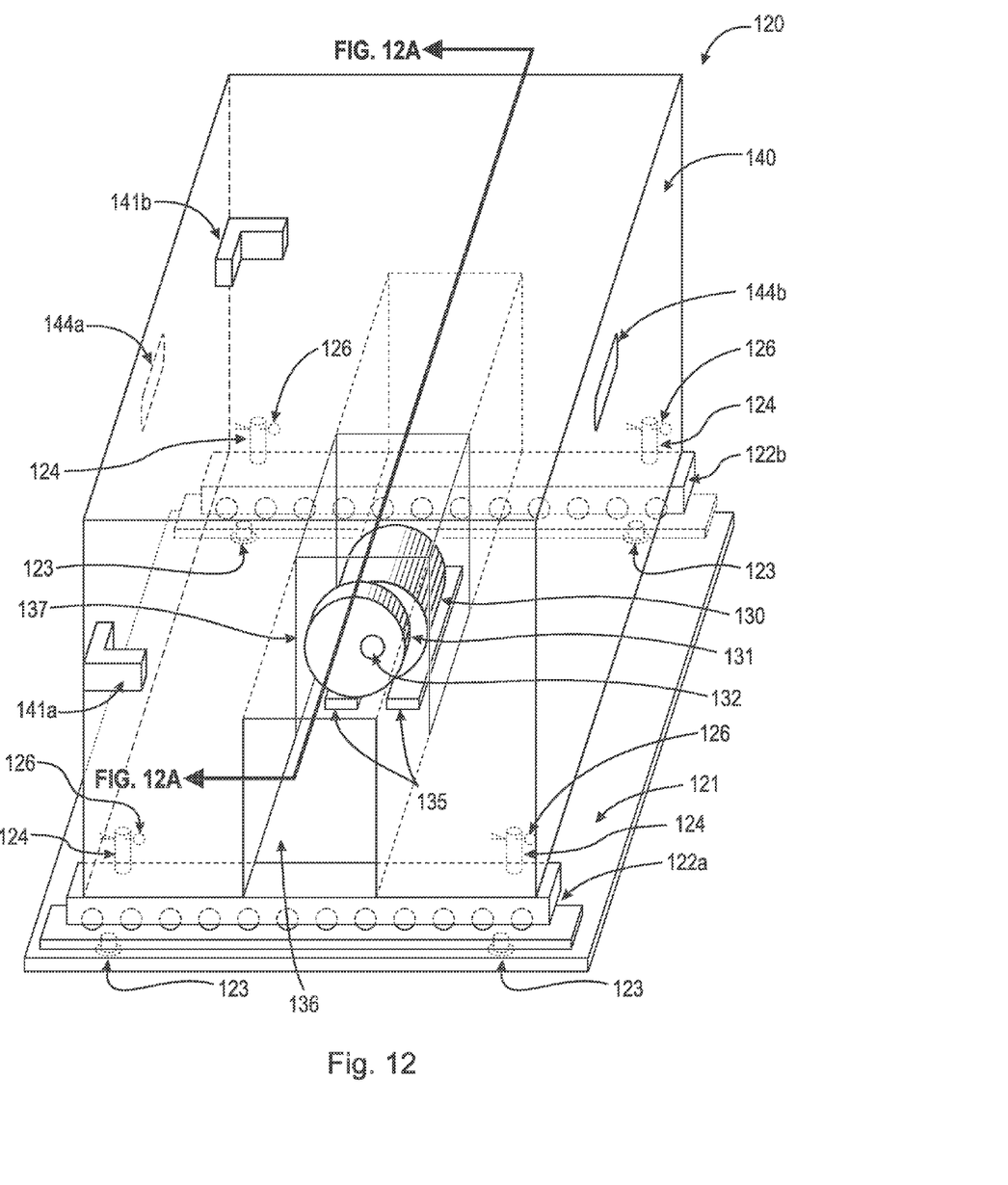
FIG. 12 is a fragmentary perspective view of a sixth embodiment of the present invention secured to body 140; and, FIG. 12a is cross-sectional view taken generally along line 12A in FIG. 12.
Figure 12A:
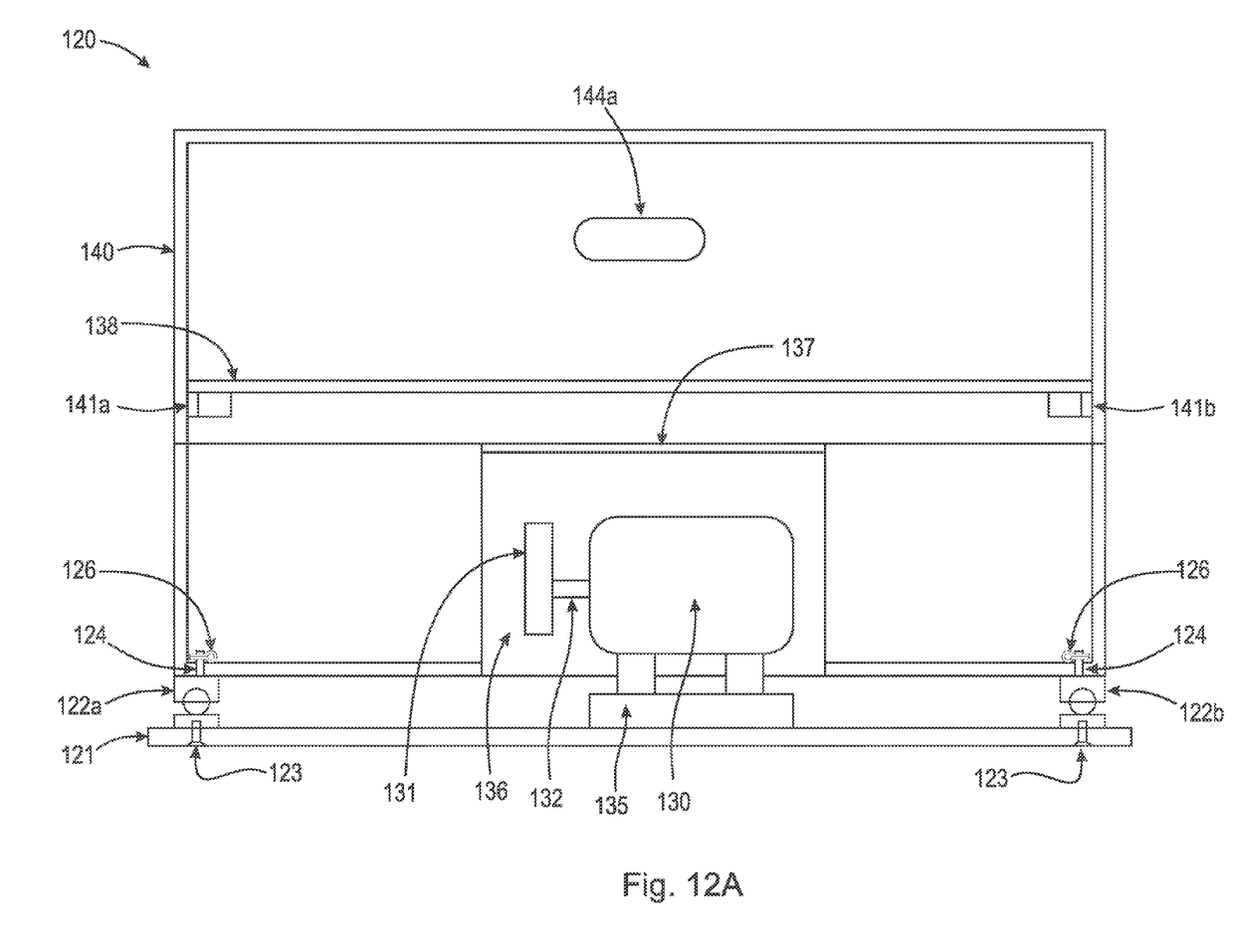

FIG. 12 and FIG. 12A are a fragmentary perspective and cross-sectional view, respectively, taken generally along line 12A in FIG. 12 of body 140. The support base 121 has ball bearing gliders 122a and 122b mounted by screws 123 so that the stationary portions of gliders 122a and 122b are supported by base 121. Mounts 124 are mounted to the movable portions of gliders 122a and 122b and body 140 is mounted on mount 124 thereby allowing body 140 side to side horizontal motion. Removable pins 126 secure body 140 to mounts 124 so that body 140 and support base 121 can be lifted and transported together. In a preferred embodiment, base 121 can be constructed of wood, plastic, metal or any suitable material, while body 140 itself can be vacuum formed from plastic with channel 136 molded into body 140. Additionally, a ¹⁄₁₀₀ horsepower motor 130 having about 10 rpm drives eccentric 131 which is mounted on shaft 132 of motor 130. Eccentric 131 can also be made of any suitable material such as wood, metal, or plastic. Motor 130 is mounted on base 121 via mounting brackets 135. Insert 137 is bonded to channel 136 to provide a wear resistant surface for eccentric 131. In operation eccentric 131 makes continuous contact against insert 137 rocking or gliding body 140 from side to side. In a preferred embodiment, insert 137 is made from a durable material such as metal. It should be appreciated, however, that the use of different materials is possible and considered to be within the scope of the invention as claimed. Bed board 138 is arranged on tabs 141a and 141b which provide a flat surface inside body 140 (shown in FIG. 12A). Bed board 138 is removable from body 140 while body 140 is also removable from support base 121 thereby allowing for easy cleaning Handles 144a and 144b are molded into body 140 providing easy lifting and carrying. Motor 130 and mounting brackets 135 are mounted so that eccentric 131 is centrally positioned in the center of body 140, providing smooth and continuous motion. Although the invention has been described in detail, modifications such as placing handles 144a and 144b of body 140 in other locations are possible. Also, pins 126 for securing body 140 to base 121 could be replaced with some other means, such as a latch or threaded bolt. With respect to the latch, body 140 would automatically lock in place when placed on base 121, but would require depression of a safety release for removal. Finally, body 140 could have small access holes at each of its corners so that pins 126 can be removed so an infant and body 140 can be removed together from its base. This would allow the body 140 to be used without rocking or gliding.

It will be appreciated that various aspects of the above-disclosed invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 1 cradle
1b chair
1e chair
1f footrest
2 base
2b base
2e base
2f heel catch
3 rocker
3b rocker
3e rocker
3f angle adjustment
4 bolt
4b bolt
4e bolt
4f attachment mechanism
5 washer
5b washer
5e washer
5f brace
6 washer
6b washer
6e spring
6f lock pin
7 nut
7b nut
7e nut
7f mounting bracket
8 mounting bracket
8b mounting bracket
8e mounting bracket
9 bracket
9b bracket
9e mounting bracket
10 device
10a motor
10e motor
10b motor
11 eccentric
11b eccentric
11e eccentric
12 linkage
12a first member
12b second member
12c third member
12d notch
12e wheel
12x dual linkage
12y dual linkage
13 notch 13b driveshaft
13c driveshaft
13d driveshaft
13e driveshaft
13 notch
14 motor
14a driveshaft
14b tension member
14c bracket
16a roller
16b roller
16c roller
16d roller
18a track
18b track
20 frame
20a point of contact
20e point of contact
30 device
100 cradle
102a rocker
102b rocker
104 bottom surface
106 surface
108 base
110 mount
112 connector
114 support plate
116 pin
118 notch
120 device
121 base
122a glider
122b glider
123 screw
124 mount
126 pin
130 motor
131 eccentric
132 shaft
135 mounting brackets
136 channel
137 insert
138 bed board
140 body
141a tab
141b tab
144a handle
144b handle
202a wheel
202b wheel
203a wheel mount
203b wheel mount
204a bracket
204b bracket
205a drawbar
205b drawbar
205c drawbar
205d drawbar
210 space
214a thumbscrew
214a thumbscrew
215a wheel guide
215b wheel guide
220l ramp
220r ramp
250 housing

What is claimed is:

1. A reciprocating rocking device for the gliding of a wheelchair, said wheelchair having two pairs of wheels, said reciprocating rocking device comprising:
   a frame comprising a pair of tracks, each track having a channel therein;
   a bracket comprising two pairs of rollers, each of said two pairs of rollers arranged for rolling engagement within one of said channels, said two pairs of rollers arranged parallel to one another and joined to one another by a first and second drawbar, said first and second drawbars arranged parallel to and spaced apart from one another and perpendicularly to said tracks, said first and second parallel drawbars configured to hold only one of said two pairs of wheelchair wheels;
   a linkage connected to said bracket;
   an eccentric connected to said linkage and arranged to move said bracket in a linear, reciprocating manner within said tracks; and,
   a motor secured to said frame, said motor having a drive shaft operatively arranged to drive said eccentric.

2. The reciprocating rocking device as described in claim 1 further comprising at least one ramp to enable mounting of said only one of said two pairs of wheelchair wheels onto said reciprocating device.

3. The reciprocating rocking device as described in claim 1 further comprising a pair of wheelguides extending between said first and second drawbars.

4. The reciprocating rocking device as describe in claim 1 wherein said only one of said two pairs of wheelchair wheels held in said device is a front pair of wheelchair wheels.

5. A reciprocating rocking device for the gliding of a wheelchair, said wheelchair having a pair of front wheels said reciprocating rocking device comprising:
   a frame comprising a pair of tracks, each track having a channel therein;
   a pair of brackets arranged parallel to said channels;
   a first pair of rollers each one of said first pair of rollers in rolling engagement with one of said tracks;
   a pair of drawbars, each of said pair of drawbars having a first end and a second end wherein each of said first ends extends through said bracket and is connected to one of said first pair of rollers;
   a linkage connected to each of said second ends of said pair of drawbars;
   an eccentric connected to said linkage and arranged to move said first pair of rollers in a reciprocating linear manner within said tracks;
   a second pair of rollers, each one of said second pair of rollers in rolling engagement with one of said tracks;
   a third drawbar having two ends, each end extending through one of said pair of brackets and connected to one of said second pair of rollers;
   a fourth drawbar having two ends, each of said two ends attached to one of said pair of brackets;
   a pair of wheelguides adjustably attached to each of said third and fourth drawbars;
   a pair of thumbscrews, one of said pair of thumbscrews arranged to tighten one of said pair of wheelguides against said fourth drawbar; and,
   a motor connected to said frame, said motor having a drive shaft operatively arranged to drive said eccentric;
   wherein said wheel guides are configured to be adjustable to form a wheel base ranging from 15 to 30 inches in width.

* * * * *